(12) United States Patent
Weisser et al.

(10) Patent No.: US 7,730,231 B2
(45) Date of Patent: Jun. 1, 2010

(54) DATA TRANSFER INTERFACE FOR A DIRECT TRANSFER OF DATA FROM A FIRST DEVICE TO A SECOND DEVICE

(75) Inventors: Pirmin Weisser, Villingen-Schwenningen (DE); Volker Urban, Villingen-Schwenningen (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 419 days.

(21) Appl. No.: 10/943,780

(22) Filed: Sep. 17, 2004

(65) Prior Publication Data

US 2005/0114575 A1    May 26, 2005

(30) Foreign Application Priority Data

Sep. 19, 2003   (EP)   .................................. 03021327

(51) Int. Cl.
*G06F 3/00*     (2006.01)
*G06F 13/00*    (2006.01)
*G06F 5/00*     (2006.01)

(52) U.S. Cl. ............................. 710/33; 710/20; 710/21; 710/31; 710/38

(58) Field of Classification Search .................. 710/20, 710/21
See application file for complete search history.

(56) References Cited

U.S. PATENT DOCUMENTS 5,058,004 A *  10/1991  Ravid ............................. 710/2
5,446,877 A     8/1995  Liu et al.
5,584,039 A *  12/1996  Johnson et al. ................ 710/6
5,898,891 A     4/1999  Meyer
6,009,491 A *  12/1999  Roppel et al. ................ 710/305
6,167,489 A *  12/2000  Bauman et al. ............. 711/145
6,301,625 B1   10/2001  McDonald et al.
6,813,698 B2 * 11/2004  Gallo et al. .................. 711/170
6,925,505 B2 *  8/2005  Wang ........................... 710/21
2002/0026551 A1* 2/2002  Kamimaki et al. ........... 710/260
2002/0103966 A1* 8/2002  Wu et al. ..................... 711/114
2006/0018051 A9* 1/2006  Chiao et al. ................... 360/31

OTHER PUBLICATIONS

Charles M. Kozierok, The PC Guide, IDE/ATA Connectors and Signals, Apr. 17, 2001, http://www.pcguide.com/ref/hdd/if/ide/confSig-c.html.*

* cited by examiner

*Primary Examiner*—Henry W. H. Tsai
*Assistant Examiner*—Kris Rhu

(57) ABSTRACT

A data transfer interface system is provided that directly transfers data from one data storage drive to another data storage drive under the control of a host. The host and data storage drives are jointly connected to one another with data lines and control lines. Each data storage drive is connected separately to the host with a read/write command line. The host initializes the data storage drives providing initialization data to the drives where the data may include position information and commend information. After initialization, the host concurrently instructs one data storage drive to read the data from the drive while the other data storage drive writes the data to memory.

42 Claims, 6 Drawing Sheets

DATA TRANSFER INTERFACE FOR A DIRECT TRANSFER OF DATA FROM A FIRST DEVICE TO A SECOND DEVICE

PRIORITY CLAIM

This application claims the benefit of European Patent Application 03021327.6 filed in the EPO on Sep. 19, 2003, which is incorporated herein by reference.

BACKGROUND OF THE INVENTION

1. Technical Field

The present invention relates to a data transfer interface system that interfaces with a controller and data storage drives. In particular, the system relates to a method for directly transferring data between multiple data storage drives.

2. Related Art

Data transfer interfaces may be found in systems that transfer digital data between communication devices, such as printers, video screens, and storage media. For instance, a data transfer interface permits a computer to send and receive information to peripheral devices such as hard disk drives and optical data storage media. The peripheral devices may connect to a control device or host via an AT-Attachment (ATA) bus with the IBM/AT PC format. The peripheral devices also may connect via the extended ATA bus standard, AT Attachment Packet Interface (ATAPI), known as ATA/ATAPI, and similar types of buses. The ATAPI supports the connection of external peripheral devices to personal computer systems.

A communication session with a peripheral device using the ATA/ATAPI bus proceeds through several steps. In the first step, the host computer writes a command to a command register in a peripheral device. The host then executes a data transfer step where data is transferred between a peripheral device to a computer and then from the computer to another peripheral device. In this operation, only a single peripheral device at a time may be selected to perform either the read operation or the write operation making the transfer of data time-consuming. Further delay is encountered when a large amount of data is transferred. Thus, a need exists to provide a data transfer interface that is capable of transferring the data between peripheral devices such as data storage drives in a more efficient manner.

SUMMARY

This application provides a data transfer interface that will efficiently transfer data between multiple data storage drives. The data transfer interface may include a connector that jointly connects two or more data storage drives with a control device. The data transfer interface may have a plurality of data lines that connect the data storage drives and the control device. The data transfer interface may also have a plurality of control data lines that connect to the data storage drives from the control device. Further, the data transfer interface may include a first read/write command line connected separately to one of the data storage drives from the host or control device. In addition, the data transfer interface may have a second read/write command line connecting to another data storage drive from the host.

The system includes a method for transferring data between the two data storage drives and a control device including a host or controller. The control device may start by initializing both of the data storage drives in preparation for a data read and/or write instruction. The initialization may include sequentially selecting the data storage drives and assigning respective storage areas for the transferred data. Data is transferred between the data storage drives to the assigned data storage areas by concurrently instructing both data storage drives with the individual read/write commands.

By replicating the read/write lines to the data storage drives, each of the data storage drives can be accessed individually. In this manner, two or more of the connected data storage drives may be configured to directly transfer data to one another. This is accomplished by instructing one data storage drive to read data and the other data storage drive to write data while the data is directly transferred without intermediate data buffering in the control device or host. Consequently, data may be more efficiently transferred without the equipment for data buffering in the controller.

The addition of the separately connected read/write lines to the data storage drives enables the individual initialization of the data storage drives. The separate read/write lines may allow the data storage areas on multiple drives to be individually selectable during the initialization steps. In addition, the controller, after initializing the data storage drives, may copy data directly to two or more data storage drives at approximately the same time.

One of the drives may be an optical disk drive and the other drive a hard-disk drive. In this data storage drive configuration, data from the optical disk drive may be transferred directly to the hard disk drive or from the hard-drive to the optical disk drive. Further, other drives and semiconductor storage devices may be connected to the data interface systems, and data may be transferred directly between any two of the data storage drives.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
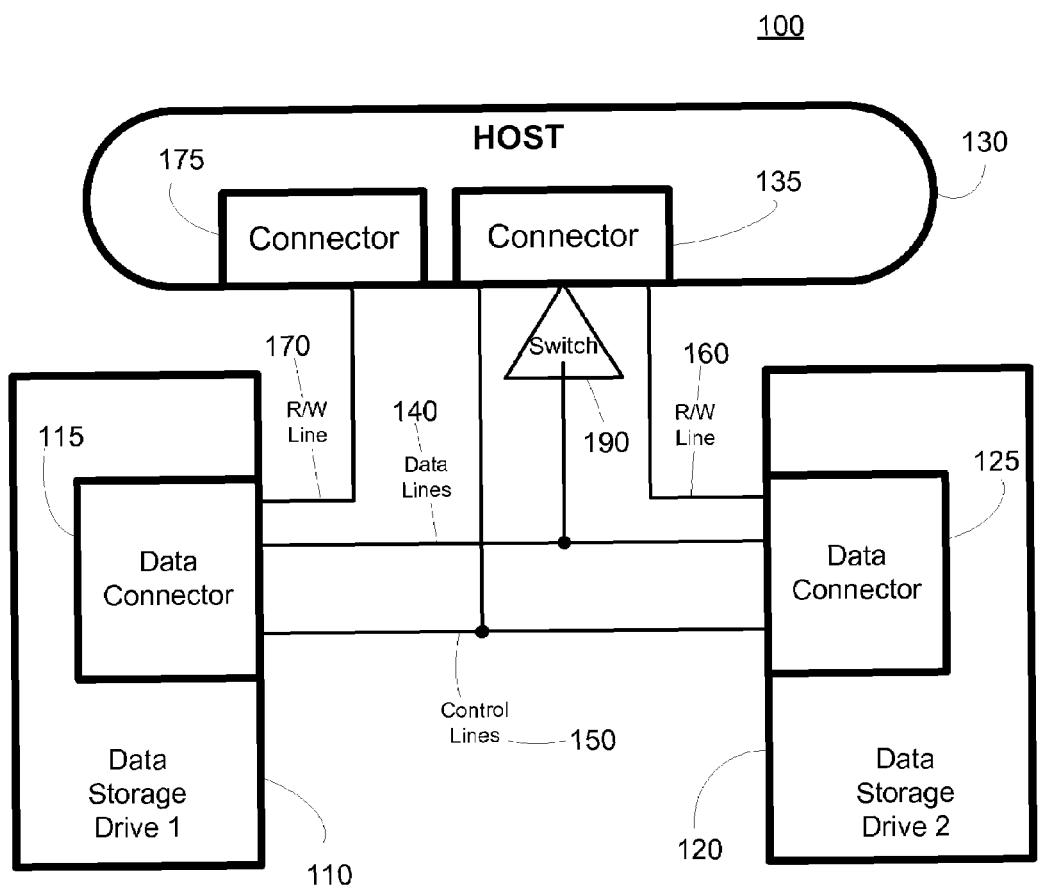
FIG. 1 is a schematic of a data transfer interface.

A data interface system for transferring data directly between two data storage drives is shown in FIG. 1. The data transfer interface 100 is configured to provide a data transfer directly between two data storage drives 110 and 120 without routing the data through a controller or host 130. The data storage drives 110 and 120 may represent a hard disk drive, an optical disk drive, a floppy drive or even a semiconductor storage device such as flash memory or another semiconductor memory system. Other storage media may include the previously mentioned storage devices as well as magneto-optical drives; removable media drives like a floppy disk drive, Zip, Syquest, Bernoulli, or Jaz drives; silicon drives; or holographic storage drives. The different types of data storage drives may also be used in any combination with one another. Both data storage drives 110 and 120 are equipped with respective data connectors 115 and 125 that connect to control lines 150 and data lines 140. The data lines 140 and the control lines 150 operably connect the data storage drives 110 and 120 to the host 130, thus making a parallel connection between the data storage units 110 and 120 and the host 130. Although not shown, other data storage drives may be added in parallel. These data storage drives may exist in peripheral device systems that are added to the host 130 or the drives may be other storage media.

Read/write lines 160 and 170 are individually provided for each of the data storage drives 110 and 120. In FIG. 1, the read/write line 170 may be connected to a connector 175 on the host 130 and to the connector 115 on the first data storage drive 110. The other read/write line 160 connects between the host 130 at connector 135 and to the connector 125 on the second storage drive 120.

By providing the individual read/write lines 160 and 170 to the two data storage drives 110 and 120 from the host 130, the drives may be individually controlled. The individual control may allow for selection of an address for a particular area on the disk of the data storage drives 110 and 120 for the read/write operation. For example, both data storage drives 110 and 120 may be initialized separately. The addresses designating the location of the different data storage areas may be defined during the initialization with the appropriate read/write commands directing the proper operation of both data storage drives 110 and 120 for the follow-on data transfer.

A direct data transfer may be accomplished such that one of the drives, such as the first data storage drive 110, may read data from the designated location on the data storage drive 110. The second data storage drive 120 may write the data to the designated storage portion of the drive 120. Consequently, the data may be transferred in a shortened period of time from the first data storage drive 110 to the second data storage drive 120.

Computer systems may use a combination of data storage drives sometimes having two, three, four or more drive systems attached to the computer system at any one time. Peripheral units also may be attached to the host having any of the previously mentioned memory units installed on the peripheral unit. Thus, a plurality of data storage drives may have data available for data transfer between any two of the available drives. The type of peripheral devices that may be connected to the data transfer interface is not limited to the explicitly mentioned data storage devices. There exists a plurality of peripheral devices that may be connected to the system.

Further, the host 130 that connects to the data storage drives may be a computer, a controller, or a data processor capable of issuing instructions and controlling the operation of other electronic devices. The host 130 may control a digital process and may be located in any equipment that involves a digital process whether the equipment is for communication, entertainment, or some type of control. The host 130 may be dependent and act in concert with another host. The control means can include digital processors, controllers, mini-controllers and other digital devices that are programmed with instructions to control a task.

In desktop computers, peripheral devices such as data storage drives 110 and 120 connect to an AT-Attachment (ATA) bus for communication with the host 130 which may be a controller or processor located inside the desktop computer. The ATA bus configured for the IBM/AT PC format has been adopted as a standard for most desktop computer systems. The ATA bus standard has been updated and extended with the AT Attachment Packet Interface (ATAPI) which is commonly known as ATA/ATAPI. The ATA/ATAPI bus is the interface extension that supports the connection of the external peripheral devices to the computer system, and in particular, to the personal computer or desktop computer system. The data transfer interface 100 can be connected to all peripheral devices equipped with a standardized connector.

In accordance with the ATA/ATAPI standard, the data storage drives 110 and 120 and other peripheral devices have a set of registers that are known as the AT task file. These registers may represent the communication interface between the host device 130 and their respective data storage drives 110 and 120, etc. The control of the connected data storage drives 110 and 120 using the task file registers is described in more detail in reference to FIGS. 1 and 2.

Figure 2:
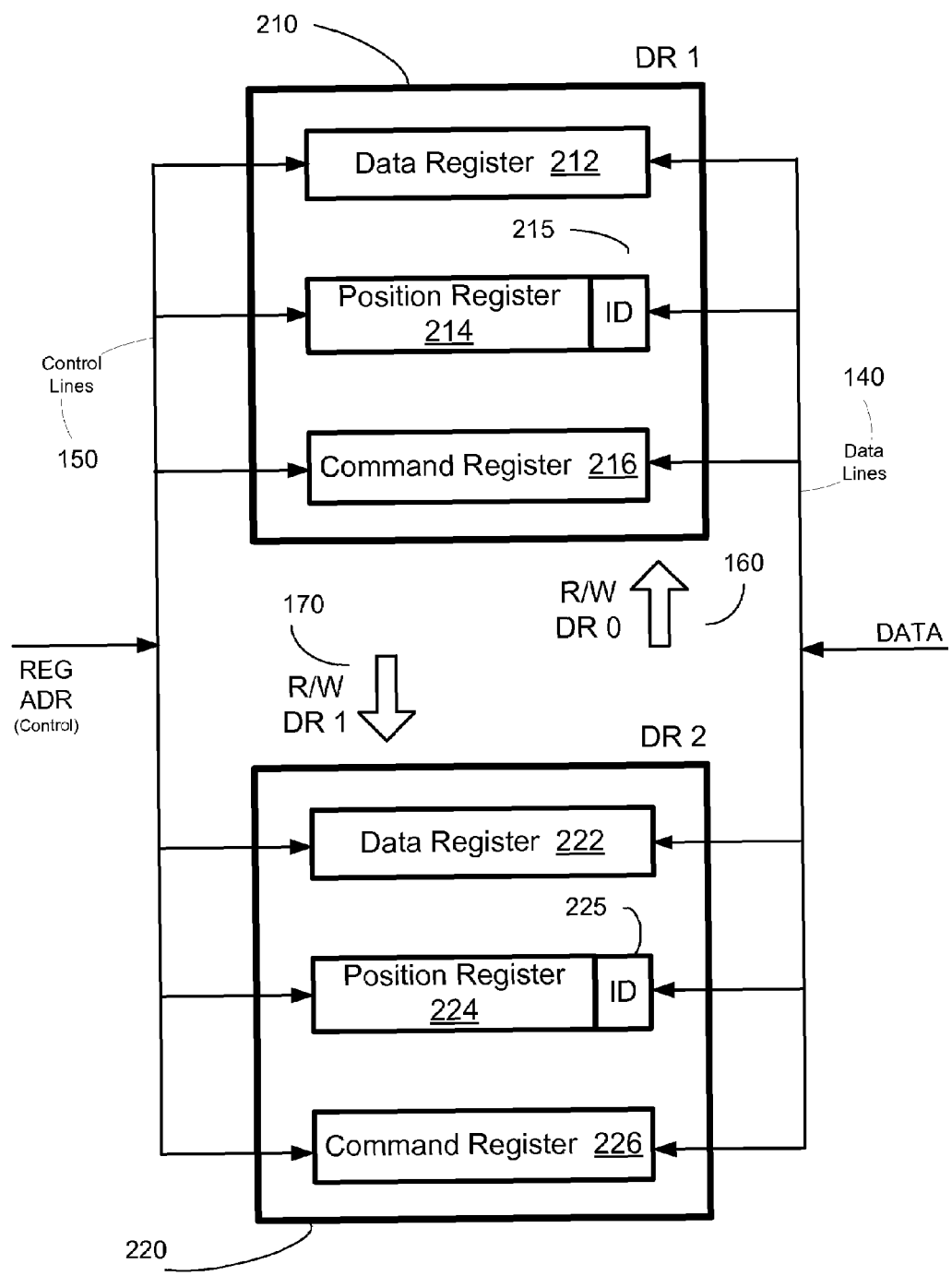
FIG. 2 is a block diagram of an example of task file registers in the data storage drives.

As shown in FIG. 2, the task files 210 and 220 will assist in data transfer during the operation of the data storage drives 110 and 120. The task files 210 and 220 may be part of the data storage drives 110 and 120. The host 130 sends the instructions along the control lines 150 and the read/write lines 160 and 170 to the task files 210 and 220. The task file 210 in the first data storage drive 110 may have a data register 212, a position register 214 and a command register 216. The task file 220 in the second data storage drive 120 may have a data register 222, a position register 224 and a command register 226. Other additional registers may also be provided in the task files 210 and 220.

The task files 210 and 220 are jointly connected to the control lines 150, which may provide the register address lines, and to the data lines 140. The control lines 150 also may select the particular register from the available registers within the task files 210 and 220 during the data transfer. The data lines 140 provide the data for the data transfer that may be written into the selected data registers 212 and 222. The data lines 140 also may receive the data stored in the selected registers 212 and 222 that was read from the designated area on one of the data storage drives 110 and 120.

Figure 3:
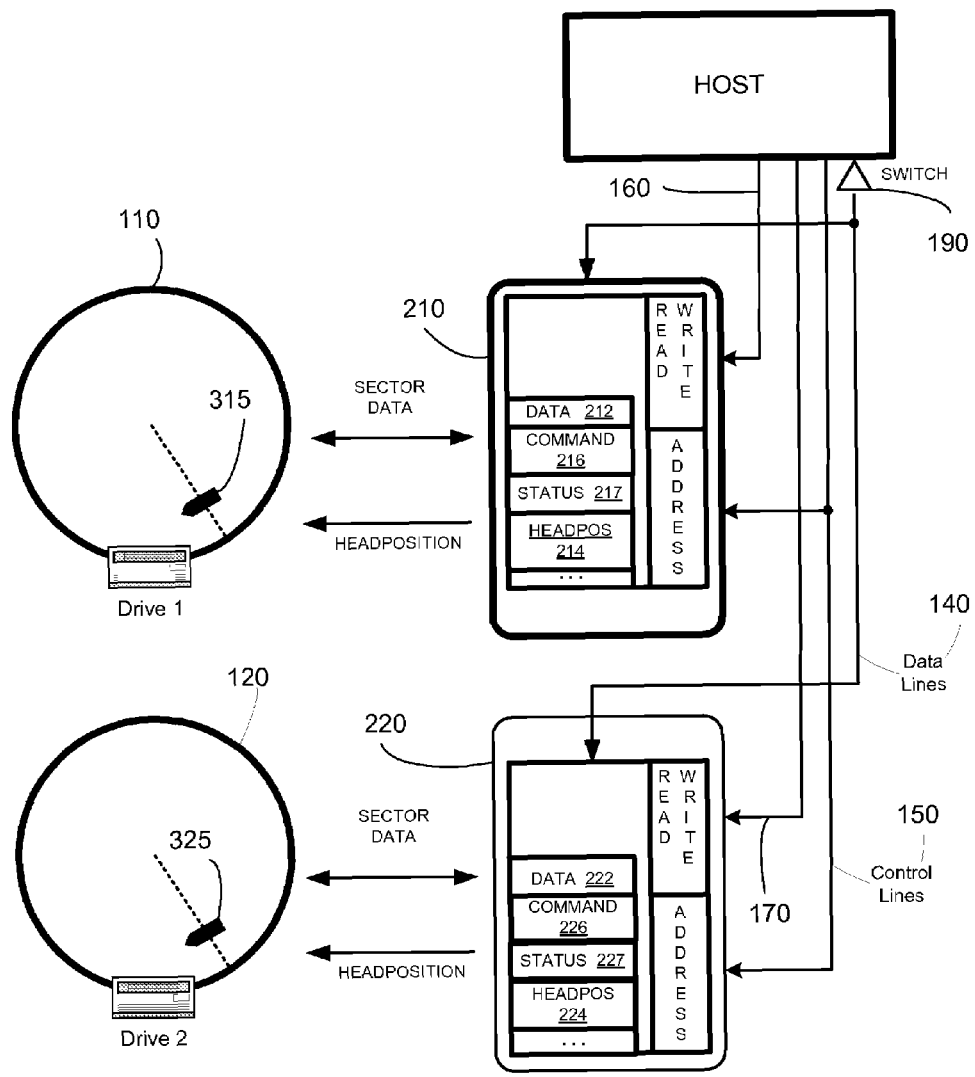
FIG. 3 is an example of a register for a data transfer interface.

FIG. 3 shows the task file registers 210 and 220 of data storage drives 110 and 120 with the connected data lines 140. During a data transfer, the data storage areas on the disk where the data may be located, or where it may be written, can be depicted by the position of the read/write heads 315 and 325 over the disks in the data storage drives 110 and 120. FIG. 3 shows the connection between the task filters 210 and 220 and the data storage drives 110 and 120. The task file registers 210 and 220 may be provided in each of the data storage drives 110 and 120. The read/write heads 315 and 325 are located in the data storage drives 110 and 120.

The disk in the data storage drives 110 and 120 may be a magnetic hard drive unit, an optical storage unit or any of the other storage devices that were mentioned previously. Accordingly, the read/write heads 315 and 325 may be magnetic pick-ups for the magnetic storage disks or optical read/write heads for the optical disks. The components of the optical read/write head may include laser diodes and photodetectors. The read/write heads 315 and 325 are connected to the task files 210 and 220.

Within the task files 210 and 220, the data registers 212 and 222 are connected to the read/write heads 315 and 325. Also connected to the read/write heads 315 and 325 are the "HEADPOS" registers 214 and 224 that may include the data for positioning the read/write heads 315 and 325 over the disk in the data storage disk drives 110 and 120. The "HEADPOS" registers 214 and 224 may contain device-specific control information such as a sector number, cylinder number, or head ID for positioning the read/write head 315 and 325. This data may control a servo-motor to position the read/write heads 315 and 325 in relation to the disk. The data registers 212 and 222 connect to the host 130 via the data lines 140 and to the data register 222 in the task file 220 of the data storage drive 120.

The control lines 150 are directly connected between the host 130 and both the task files 210 and 220. The control lines 150 may include address information that controls the flow of data between the task files 210 and 220 and the data storage drives 110 and 120. The address information may be supplied to the task files 210 and 220 either sequentially or concurrently. During the sequential step, the control lines may contain positional information for the read/write heads 315 and 325. During the concurrent step, the control data may include the address information for the data registers 212 and 222 allowing for the direct transfer of data between the data storage drives 110 and 120.

The host 130 controls the data transfer with the control lines 150 and with the read/write signals on the read/write lines 170 and 160. The data signals and control signals may be jointly available to the data storage drives 110 and 120 and to the control device 130 no matter which one of the connected devices is the source of the data. However, the control device 130 may exert further control over the data transfer process by individually transmitting the read/write signals to each of the connected drives 110 and 120. Since the data signals and control signals are available at all devices, the controller or host 130 may control the transfer of data with the individual read/write command lines 170 and 160 by sending a write signal or a read signal. The individual read/write commands may instruct the individual data storage drives 110 and 120 to write and/or read data concurrently depending upon the transfer requirements. The concurrent data transfer may occur after the data storage drives 110 and 120 have been initialized.

In the data interface system 100, multiple devices may be connected to the ATA/ATAPI bus. These devices may be peripheral devices that include data storage devices. The host 130 may have multiple read/write lines individually connecting the host 130 to each of the added peripheral devices. The control information on the control lines 140 and data on the data lines 150 may be available to all of the data storage drivers in the added peripheral devices. The host 130 may control the transfer of data directly between any of the drives with the individual read/write lines that connect to each drive.

The read/write lines 160 and 170 connecting the host 130 to the data storage drives 110 and 120 may consist of two lines. One line may provide the read command and while the other line provides the write command. The additional line for the data transfer interface may simplify the direct data transfer from one data storage drive 110 to another data storage drive 120, otherwise known as the targeted data storage drive.

Figure 4:
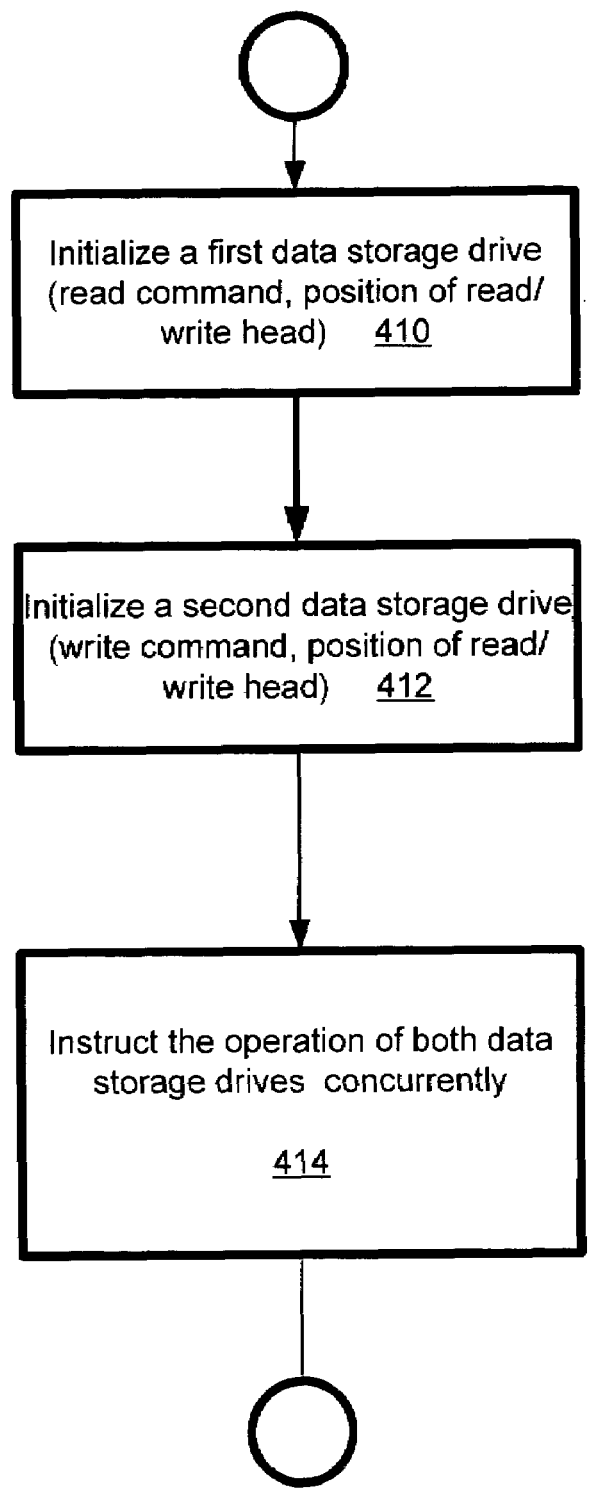
FIG. 4 is an exemplary flow chart for transferring data between the data storage drives.
Figure 5:
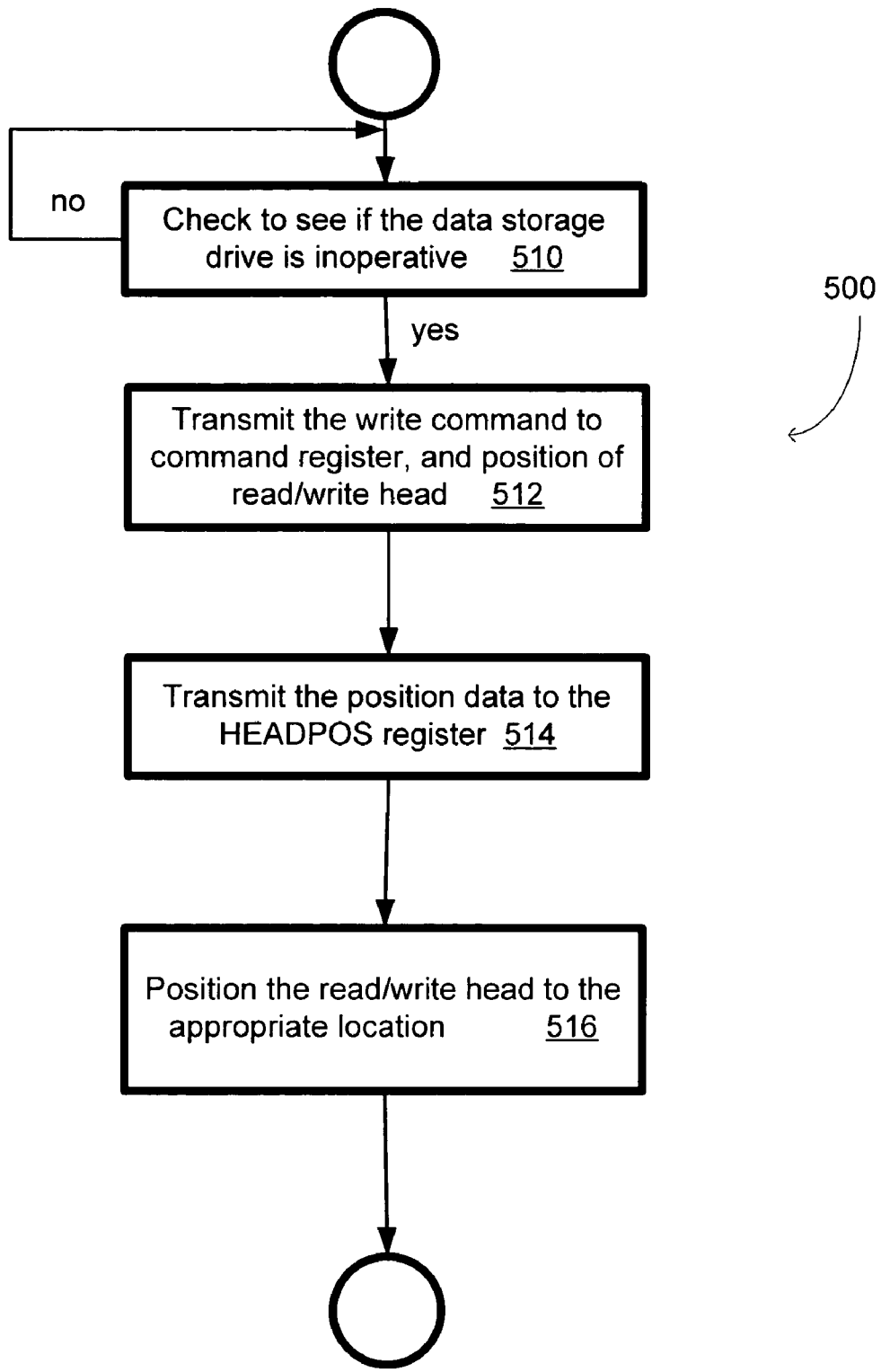
FIG. 5 is an exemplary flow chart for the initialization of the data storage drives.

The data transfer process in the data interface system may be better understood by way of an example and the process flowchart of FIG. 4. Assume that the first data storage device 110 will read the data and the data will be transferred and written to the second data storage device 120. As the first step 410, the first data storage drive 110 may be initialized. The initialization process is broken down and further shown in FIG. 5. As the first step 510, the controller 130 checks to see if the first data storage drive 110 is inoperative. If the drive is not operating, then the first data storage drive 110 will receive further initialization data 512. During initialization 410, the data lines 150 and control lines 140 will receive initialization data. The initialization data may include the read command that will be stored in the command register 216. The initialization data may also include position data. The position data will be stored 514 in the HEADPOS register 214. The position data indicates the intended position, location or address of the read/write head 315 for obtaining and reading the data. The position data also may control the servos that position the read/write head 315. When the HEADPOS is set, the read/write head 315 will move to the appropriate location over the disk 516 where the data later may be found and read.

After the initialization procedure 410 for the first data storage drive 110 is completed, an initialization procedure 412 may be performed for the second data storage drive 320. The second data storage device 120 may be initialized 412 in sequential order after the first data storage drive 110 completes the initialization process. In some instances, the second data storage device 120 may be initialized at the same time that the first data storage drive 110 is initialized. The second data storage drive 120 may follow the same initialization process that the first data storage drive 110 followed in FIG. 5. The host 130 may determine whether the second data storage drive 120 is inoperative 510. When the drive 120 is inoperative, the initialization process may continue. During the initialization 412, the second data storage drive 120 may receive commands 512 and 514 over the control lines 140 and the data lines 150. The command register 226 will receive the write command 512. The HEADPOS register 224 receives 514 the position data regarding the location on the drive 120 where the data may be written. The position data controls the servos that will position 516 the read/write head 325 over the disk. Since the data most likely will be physically located to a different area of the disk when compared to the first data storage drive 110, the sequential nature of the initialization allows the read/write head 325 to be directed to a different location on the second data storage drive 120 than the first data storage drive 110.

In order to be able to individually initialize each task file 210 and 220 for both of the data storage drives 110 and 120, the read/write lines 170 and 160 may be provided separately for each of the drives from the host 130. The presence of the individual read/write lines 170 and 160 enables the sequential transfer of control data that selects the particular register and storage locations in an area on the data storage drives 110 and 120. The particular area on the drive is where the data will be read from or written to during the data transfer. In the continuing example, the second data storage drive 120 may have a write command sent to the command register 226, whereas the first data storage drive may have a read command sent to the command register 216.

After the initialization procedures 410 and 412 are completed, the first data storage drive 110 is instructed 414 to read data from the disk, while the second data storage drive 120 is instructed to write data to the disk. In step 414 of the direct data transfer, the drives 310 and 320 may receive the instructions in a concurrent fashion. Concurrent means that the operation for both data storage drives are in parallel, and that the operation occurs at about the same time if not simultaneously. As described earlier, the data storage drives 110 and 120 share the control (address) lines 150 and the data lines 140 with the host. However, the read/write lines 160 and 170 are connected individually from the host 130 to each of the data storage drives 110 and 120. Therefore, the separate instructions are delivered to the data storage drives 110 and 120 at about the same time, with the read instruction issued to the first data storage drive 110 and the write instruction to the second data storage drive 120. The data transfer is essentially a direct transfer from one data storage device to another.

In order to directly transfer the data successfully between the data storage drives 110 and 120, it may be desirable to isolate the circuitry in the host 130 that is connected to the data lines 140. The circuitry in the host 130 may load the data interface system 100 making the transfer of data unsuccessful. Thus, the data lines 140 at the host 130 may be switched to high impedance using a switch 190. The high impedance may achieve the proper isolation of the host circuitry when a data transfer occurs between the two data storage drives 110 and 120. A switch suitable for the purpose of isolating the host 190 may be a tri-state driver. The tri-state driver may connect and disconnect the host 130 branch of the data lines 140 from the data storage drives 110 and 120. Other switch means may be used to effect the same isolation. Such switches may include relays, mechanical switches or other solid-state switches such as transistors configured to handle such switching functions including varying types of FETs and bipolar transistors.

In the data transfer interface system 100, data is transferred from one data storage drive 110 to the targeted data storage drive 120. The data transfer interface system 100 may avoid the transfer of data to the host 130 where the host 130 buffers and stores the transferred data until the host 130 receives the amount of information that corresponds to its memory or cache capacity. Then the data is transferred to the targeted or second date storage drive 120. Since this system 100 enables a direct data transfer between the interconnected data storage drives, the processing power of the host 130 remains available for other operations during the direct data transfer phase and a reduced processing load results from the direct data transfer.

The host 130 also may have data that will be transferred to both data storage drives 110 and 120 concurrently to store identical data on the data storage drives 110 and 120. Use of the data transfer interface 100 may provide a simple back-up procedure by simultaneously writing the data to multiple drives. Also, the procedure of designating a Redundant Array of Inexpensive Disks ("RAID") may be used. A RAID may involve a number of data storage drives that act as a reliable single disk drive. When used with a RAID, the data transfer interface 100 employs individual read/write lines 160 and 170 connecting the host 130 to the data storage drives. Thus each data storage drive has an individual read/write line connected to the host 130.

Figure 6:
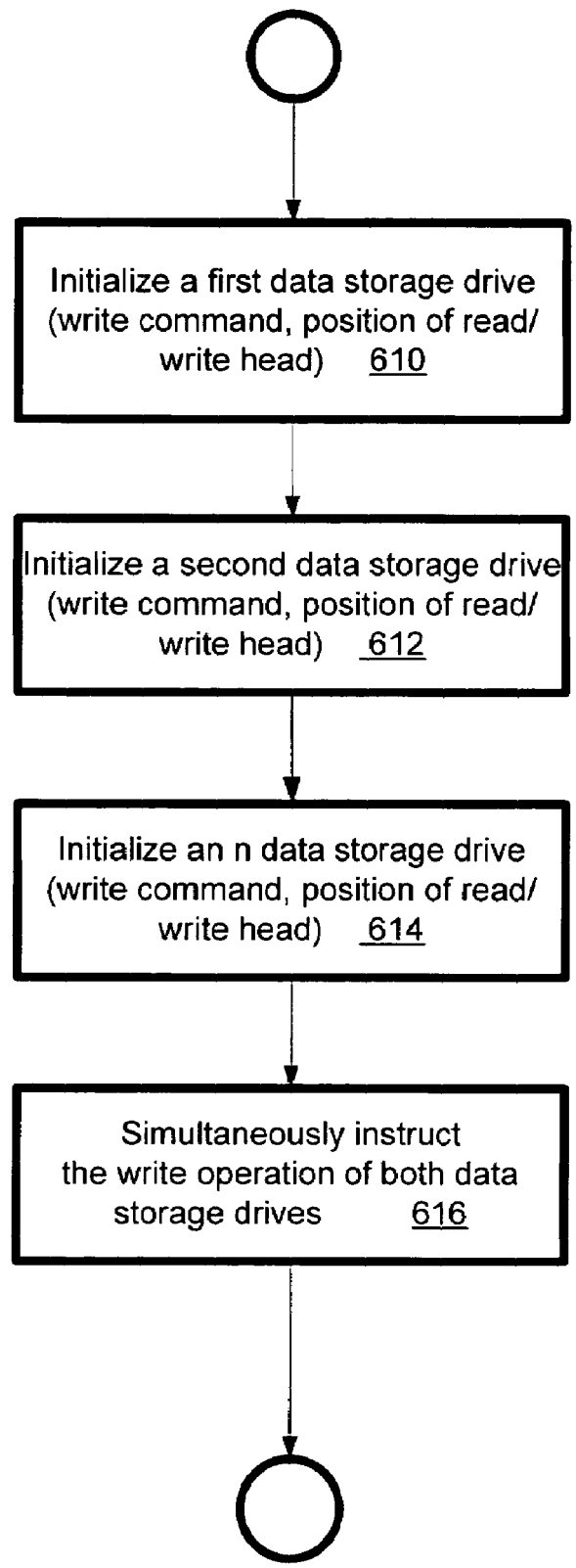
FIG. 6 is an exemplary flow chart for transferring data to multiple data storage drives.

FIG. 6 shows a multiple data storage drive write operation. The multiple data storage write operation is similar to a direct data transfer procedure between two data storage drives 110 and 120. First, an initialization 610 may be performed on the first data storage drive 110. The initialization process may be the process of FIG. 5. The host 130 determines if the data storage drive 110 is operating 510. If the data storage drive 110 is not operating, the initialization proceeds. The data lines 140 and control lines 150 will transmit 512 and 514 the initialization data to the task file 210. The command register 216 receives the write command from the host 512. The HEADPOS register 214 may receive 514 the position data indicating the position of the drive where the desired data will be written. The position data will control the servos that position the read/write head 315, and the read/write head 315 will be positioned 516 to the proper location.

Once the first data storage drive is initialized 610, the second data storage drive will then be initialized 612. The process of FIG. 5 will be repeated. The host 130 will determine if the second data storage drive 120 is operating 510. If not, the data lines 140 and control lines 150 will transmit 512 and 514 the initialization data to the task file 220. The command register 226 receives 512 the write command from the host 130. The HEADPOS register 224 may receive 514 the position data indicating the position of the drive 120 where the desired data will be written. The position data will control the servos that position the read/write head 325 and the read/write head 325 will be positioned 516 accordingly. Again, the location for the write information on the second data storage drive 120 may not coincide with the same area on the first data storage drive 110. Therefore, the sequencing of the initialization may be carried out to specify the different positions for the read/write heads 315 and 325. If it is desired that another data storage drive or drives receive a concurrent data transfer, the host 130 may initialize the data storage drive if one is available. The process for initializing the third or more data storage drive is carried out in step 614.

After the initialization of the data storage drives 110 and 120, the host 130 may concurrently instruct 616 both of the data storage drives 110 and 120 to write the data to the disks. During this step 616, the host transfers the data to the data storage drives 110 and 120. The host 130 also may instruct any other data storage drives to write data if the drives were initialized previously. The data may originate from the host 130 and also may originate from various other devices through the host 130.

In accordance with the ATA/ATAPI standard, the data lines 140 comprise 16 individual lines in parallel, while the data control lines 150 are composed of 3 address lines. Further, there may be two lines in the read/write command line 160 and 170. The first line will transmit the read command and the second line will transmit the write command. In this configuration, the data transfer interface may be connected to any peripheral device having the standardized data connector.

Although the previous description describes a connection of two data storage drives 110 and 120 to a host 130 or control device, the data transfer interface 100 is not limited by this description. Additional data storage drives may be connected in an identical manner, i.e., by providing additional read/write lines for individually controlling the initialization procedure for the affected devices. Thus, the data transfer interface 100 can copy data between any two data storage drives selected from all interconnected data storage drives.

Data transfer interfaces may be used in vehicle entertainment and information systems. Such systems may be updated on a continuing basis since navigation information changes as roads are built or new housing subdivisions are developed. Where a vehicle entertainment and information system comprises a single optical drive for compact disks ("CD") and digital video disks ("DVD"), time-consuming update procedures may block the use of the DVD drive for other applications, such as listening to a CD or viewing a video program on a DVD. By employing a data transfer interface 100 capable of direct data transfers, the navigational update information may be transferred in a timely manner. The navigation data may be continually updated to a re-writeable storage medium such as a hard-disk drive, and the optical drive, the CD or DVD drive, may be employed for other entertainment purposes.

The data transfer interface system also may be employed in any application for software or database updates. Using the direct transfer between data storage drives through the data interface system, advantages such as shortened transfer times are attained and updates are more convenient to the users. Applications for entertainment systems as mentioned above are also easily and efficiently implemented. CDs and DVDs may be used on computer systems and the data may be transferred to a hard drive for later viewing. The CDs may have database information or picture information that is transferred to the hard drive. The operator of the system may use the CD for entertainment, listening to audio CDs while viewing the transferred database and pictures since the information is presently stored on the hard drive. The data transfer may have been a direct transfer of information from the CD drive to the hard drive, minimizing the inconvenience of the transfer process to the operator.

The present application provides a data transfer interface 100 that individually controls the direct data transfer between two or more data storage drives. In this manner, a direct data transfer between any two data storage drives of a plurality of data storage drives may be accomplished and a copy of the data may be achieved in an accelerated manner. Further, data may be transferred from the host 130 directly to a plurality of data storage drives.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A data transfer interface for connecting a plurality of data storage drives and a controller, comprising: a plurality of data lines jointly connected in parallel to the plurality of data storage drives and the controller; a plurality of control lines jointly connected in parallel to the plurality of data storage drives and the controller; a plurality of read/write command lines connecting, the controller with the plurality of data storage drives, where each of the plurality of data storage drives is connected with the controller by a separate read/write command line of the plurality of read/write command lines, where at least a first read/write command line of the plurality of read/write command lines connects to a first data storage drive of the plurality of the data storage drives and connects to the controller; further where a second read/write command line of the plurality of read/write command lines connects to a second data storage drive of the plurality of the data storage drives and connects to the controller; where the controller initializes two of the plurality of data storage drives by sequentially selecting two of the plurality of data storage drives and identifying assigned data storage areas for each of the selected data storage drives; where read or write command is transferred over the first read/write command line with the assigned data storage area for the first data storage drive and a write or read command, respectively, is transferred over the second read/write Command line with the assigned data storage area for the second data storage drive; and a switch that isolates the data lines from the controller during a direct data transfer between the first data storage drive and the second data storage drive by disconnecting the plurality of data lines from the controller.

2. The data transfer interface according to claim 1, where the controller controls a direct data transfer between the first data storage drive and the second data storage drive.

3. The data transfer interface according to claim 1, where the controller transfers data from the controller to the plurality of data storage drives writing the data concurrently to the plurality of data storage drives.

4. The data transfer interface according to claim 1, where the controller transfers data from the controller to the first data storage drive and the second data storage drive writing the data concurrently to both drives.

5. The data transfer interface according to claim 1, where the controller controls the data transfer by controlling data signals on the data lines and control signals on the control lines to the plurality of the storage drives and by individually transmitting read/write signals on the read/write command lines to two of the plurality of data storage drives.

6. The data transfer interface according to claim 5, where the controller sequentially outputs the read/write signals to the first data storage drive and the second data storage drive to initialize the first and second data storage drives for a data transfer.

7. The data transfer interface according to claim 6, where the controller concurrently outputs the read/write signals to the first data storage drive and the second data storage drive.

8. The data transfer interface according to claim 5, where a first output of a first read control signal to the first data storage drive assigns a data storage location on the first data storage drive for reading data and a second output of the second write signal to the second data storage drive assigns a data storage location on the second data storage drive for writing data.

9. The data transfer interface according to claim 8, where the controller transfers data from a first data storage device to a second data storage device by concurrently outputting a read control signal on said first read/write command line and a write control signal on the second read/write command line.

10. The data transfer interface according to claim 1, where the read/write command lines include a read command line for outputting a read command and a write command line for outputting a write command.

11. The data transfer interface according to claim 1, where the data lines include 16 lines.

12. The data transfer interface according to claim 1, where the control lines include 3 lines.

13. The data transfer interface according to claim 1, where the data lines, the control lines and the read/write command lines are configured in accordance with the ATA/ATAPI standard.

14. The data transfer interface according to claim 1, where the plurality of data storage drives includes optical disk drives.

15. The data transfer interface according to claim 1, where the plurality of data storage drives includes hard disk drives.

16. The data transfer interface according to claim 1, where the plurality of data storage drives includes semiconductor storage drives.

17. The data transfer interface according to claim 1, where video, audio, navigation or other data are transferred from the first data storage drive to the second data storage drive.

18. The data transfer interface according to claim 1, where the data transfer interface is located in a vehicle information system.

19. The data transfer interface according to claim 1, where the data transfer interface is located in a processing system.

20. A computer system having a host operably connected to a data transfer interface, the host comprising:
   a plurality of data storage drives;
   a plurality of data lines jointly connecting in parallel a controller to the plurality of data storage drives;
   a plurality of control data lines jointly connecting in parallel the controller to the data storage drives;
   a plurality of read/write command lines connecting the controller to the data storage drives, where each of the data storage drives is connected to the controller by a different one of the read/write command lines and each of the data storage drives is initialized separately with the respective different read/write command lines where the initialization comprises designating an area on the initialized data storage drive for a transfer of data; and a switch at the host for connecting and disconnecting the plurality of data lines from the Controller, where the host is isolated during a direct data transfer between the data storage drives by disconnecting the plurality of data lines from the controller.

21. The computer system according to claim 20, where each of the read/write command lines includes a read command line fix a read command and a write command line for a write command.

22. The computer system according to claim 20, where the data lines include 16 lines.

23. The computer system according to claim 20, where the area indicates a position of a read/write head for obtaining and reading data.

24. The computer system according to claim 20, where the data lines, control lines and the read/write command lines are configured in accordance with the ATA/ATAPI standard.

25. A method for directly transferring data between a first data storage drive and a second data storage drive comprising: initializing the first data storage drive and the second data storage drive with a host that concurrently transmits read/write commands to the first data storage drive and to the second data storage drive by sequentially selecting the data storage drives and assigning a respective data storage location thereon; providing concurrent instructions to the first data storage drive and to the second data storage drive, where the instructions to the first data storage drive comprise writing data, and the instructions to the second data storage drive comprise reading the data; transferring the data directly from the second data storage drive to the first data storage drive; and isolating the data lines from the host when directly transferring data between the first data storage device and the second data storage device by disconnecting the plurality of data lines from the controller.

26. The method according to claim 25, where the first data storage drive and the second data storage drive are operably connected to the host by a plurality of data lines and a plurality of control lines and the first data storage drive and the second data storage drive are individually connected to the host respectively by a read/write command line.

27. The method according to claim 26, where the read/write command line includes a read command line for outputting a read command and a write command line for outputting a write command.

28. The method according to claim 25, further comprising transferring data from the first data storage drive directly to the second data storage drive by concurrently instructing the first data storage drive to read data from an assigned data storage location and by instructing the second data storage drive to write data to an assigned data storage location.

29. The method according to claim 25, where the data lines include 16 lines for transferring data.

30. The method according to claim 25, where the control lines include 3 address lines.

31. The method according to claim 25, where the method accords with the ATA/ATAPI standard.

32. A data transfer interface comprising:
a means for controlling data transfer;
a first means for storing data, the first means for storing data in communication with the means for controlling data transfer;
a second means for storing data, the second means for storing data in communication with the means for controlling data transfer;
a plurality of control lines and a plurality of data lines jointly connecting in parallel the means for controlling data transfer and the first and second means for storing data;
a plurality of read/write command lines, where the first means for storing data is connected with the means for controlling data transfer with a first read/write command line of the plurality of read /write command lines and where the second means for storing data is connected with the means for controlling data transfer with a second read/write command line of the plurality of read /write command lines; and
a switching means for connecting and disconnecting the plurality of data lines from the means for controlling data transfer, where the means for controlling data transfer is isolated during a direct data transfer between the data storage drives by disconnecting the plurality of data lines from the controller;
further where each of plurality of read/write command lines connects an individual means for storing data with the means for controlling data transfer.

33. The data transfer interface according to claim 32, where the first read/write command line and the second read/write command line includes a read command line for a read command and a write command line for a write command.

34. The data transfer interface according to claim 32, where the data lines include 16 lines.

35. The data transfer interface according to claim 32, where the control lines include 3 lines.

36. The data transfer interface according to claim 32, where the data lines, control lines and the first read/write command line and the second read/write command line are configured in accordance with the ATA/ATAPI standard.

37. The data transfer interface according to claim 32, where the means for controlling data transfer performs a direct data transfer between the first means for storing data and the second means for storing data.

38. The data transfer interface according to claim 32, where the means for controlling data transfer transfers data from the means for controlling data transfer to the first means for storing data and the second means of storing data concurrently.

39. A data transfer interface according to claim 38, where the means for controlling data transfer first initializes the first means for storing data and then initializes the second means for storing data for a data transfer.

40. A data transfer interface according to claim 39, where the initialization of the first means for storing data assigns a data storage location on the first means for storing data for reading data and the initialization of the second means for storing data assigns a data storage location on the second means for storing data for writing data.

41. A data transfer interface according to claim 38, where the means for controlling data transfer outputs the read/write signals to the first means for storing data and to the second means for storing data.

42. A data transfer interface according to claim 32, where the means for controlling data transfer has a connector for connecting to the second read/write command line.

* * * * *